(12) United States Patent
Edwards et al.

(10) Patent No.: US 12,205,573 B2
(45) Date of Patent: Jan. 21, 2025

(54) AUDIBLE TRANSACTION VERIFICATION WITH AN ASSISTANCE DEVICE

(71) Applicant: Capital One Services, LLC, McLean, VA (US)

(72) Inventors: Joshua Edwards, Philadelphia, PA (US); Abdelkader M'Hamed Benkreira, Washington, DC (US); Noel Lyles, Alexandria, VA (US); Michael Mossoba, Great Falls, VA (US)

(73) Assignee: CAPTIAL ONE SERVICES, LLC, McLean, VA (US)

( * ) Notice: Subject to any disclaimer, the term of this patent is extended or adjusted under 35 U.S.C. 154(b) by 260 days.

(21) Appl. No.: 17/847,266

(22) Filed: Jun. 23, 2022

(65) Prior Publication Data

US 2023/0419949 A1  Dec. 28, 2023

(51) Int. Cl.
*G10L 13/08* (2013.01)
*G06Q 20/16* (2012.01)
*G06Q 20/40* (2012.01)
*G10L 15/26* (2006.01)

(52) U.S. Cl.
CPC .............. *G10L 13/08* (2013.01); *G06Q 20/16* (2013.01); *G06Q 20/40145* (2013.01); *G10L 15/26* (2013.01)

(58) Field of Classification Search
CPC ......... G10L 13/08; G10L 15/26; G06Q 20/16; G06Q 20/40145; G06Q 20/20; G06Q 20/204; G06Q 20/209; G06Q 20/321; G06Q 20/322; G06Q 20/34; G06Q 20/42; G06Q 20/3272; G06F 3/167; G07G 1/06; G07G 1/0036

See application file for complete search history.

(56) References Cited

U.S. PATENT DOCUMENTS

| 10,083,443 | B1* | 9/2018 | Steshenko | G06Q 20/3278 |
| 10,838,056 | B1 | 11/2020 | Cai et al. | |
| 2006/0190351 | A1* | 8/2006 | Dennis | G06F 3/04842 379/201.01 |
| 2011/0184819 | A1* | 7/2011 | Mon | G06Q 40/00 705/16 |
| 2011/0225057 | A1* | 9/2011 | Webb | G06Q 20/326 705/16 |
| 2012/0290449 | A1* | 11/2012 | Mullen | G06Q 20/3278 705/26.1 |
| 2014/0244506 | A1* | 8/2014 | Gramling | G06Q 20/321 705/41 |

(Continued)

*Primary Examiner* — Bhavesh M Mehta
*Assistant Examiner* — Darioush Agahi
(74) *Attorney, Agent, or Firm* — FOLEY & LARDNER LLP

(57) ABSTRACT

A user assistance device aids validation of transactions on payment terminals. A payment terminal that accepts a payment card at a point of sale can be detected. A transaction amount for validation can be determined from the payment terminal. Subsequently, audio of the transaction amount can be generated. Playing of the audio on a user assistance device can then be triggered, allowing a user to hear the transaction amount before accepting or rejecting the transaction. Further, transaction information can be analyzed and used to suggest whether a customer should accept or reject the transaction.

20 Claims, 9 Drawing Sheets

(56) References Cited

U.S. PATENT DOCUMENTS

| | | | |
|---|---|---|---|
| 2014/0279479 A1* | 9/2014 | Maniar | G06Q 20/382 |
| | | | 705/41 |
| 2014/0368627 A1 | 12/2014 | Kalvenes et al. | |
| 2015/0058145 A1* | 2/2015 | Luciani | G06Q 20/3274 |
| | | | 705/17 |
| 2015/0242096 A1 | 8/2015 | Carro et al. | |
| 2016/0098692 A1 | 4/2016 | Johnson et al. | |
| 2017/0061405 A1* | 3/2017 | Bryant | G06Q 20/4014 |
| 2018/0150900 A1 | 5/2018 | Kurian et al. | |
| 2018/0241889 A1 | 8/2018 | Enomoto | |
| 2019/0130390 A1* | 5/2019 | Bohra | G06Q 20/3272 |
| 2019/0286897 A1 | 9/2019 | Asano et al. | |
| 2019/0287083 A1* | 9/2019 | Wurmfeld | G06Q 20/321 |
| 2020/0097965 A1* | 3/2020 | Castoro | G10L 15/22 |
| 2020/0265222 A1 | 8/2020 | Sodano et al. | |
| 2020/0294042 A1* | 9/2020 | Day | G07F 19/201 |
| 2020/0402036 A1 | 12/2020 | Doka et al. | |
| 2021/0125170 A1 | 4/2021 | Woodall et al. | |
| 2021/0326841 A1* | 10/2021 | Gupta | G06K 7/0065 |
| 2023/0328168 A1* | 10/2023 | Huang | G02B 27/017 |

* cited by examiner

AUDIBLE TRANSACTION VERIFICATION WITH AN ASSISTANCE DEVICE

BACKGROUND

Payment terminals are special-purpose machines built to enable electronic fund transfer with payment cards, such as debit and credit cards. Most payment terminals include a slot where a credit card can be swiped or inserted to enable the terminal to read card information. Subsequently, the payment terminal can communicate with a merchant services provider or bank to authorize payment. The terminal can then communicate with a merchant point of sale system as to whether the card is approved or declined. Before completing a purchase, a payment terminal presents a total transaction amount on a terminal display and requests that the customer verifies the total to be charged. For instance, the customer can be instructed to press a green button on the payment terminal to accept the amount or a red button to reject the amount.

SUMMARY

The following presents a simplified summary to provide a basic understanding of some aspects of the disclosed subject matter. This summary is not an extensive overview. It is not intended to identify key/critical elements or delineate the scope of the claimed subject matter. Its sole purpose is to present some concepts in a simplified form as a prelude to the more detailed description presented later.

Briefly described, disclosed aspects of the subject disclosure pertain to audible transaction verification with a user assistance device. A payment terminal at a point of sale can be detected automatically in conjunction with use of a payment card to checkout. Subsequently, transaction information can be acquired from the payment terminal. In one instance, the transaction information can be acquired through established wireless communication between the payment terminal and the user assistance device. In another instance, an image of the payment terminal display can be captured and analyzed to recognize the text. An audio representation of the text acquired from the payment terminal can be generated. Playing the audio representation on the user assistance device can then be triggered. Transaction information can also be analyzed and utilized to aid a user in transaction verification.

According to one aspect, a disclosed embodiment can include a system that comprises a processor coupled to a memory that includes instructions that, when executed by the processor, cause the processor to automatically detect a payment terminal that supports electronic payment through payment cards at a point of sale, determine a transaction amount presented by the payment terminal for validation from the payment terminal, generate audio of the transaction amount with a text-to-speech converter, trigger playing of the audio on a wearable user assistance device. The instructions further cause the processor to establish wireless communication with the payment terminal and determine the transaction amount based on communication with the payment terminal. The instructions can further cause the processor to detect the presence of the payment terminal based on computer vision analysis of one or more images captured by the user assistance device. Further, the instruction can cause the processor to request by way of the user assistance device that a user initiate wireless communication between the payment terminal and the user assistance device in which the request instructs the user to activate the wireless communication from the payment terminal. The instructions can further cause the processor to generate a recommendation to approve or deny the transaction amount based on analysis of the transaction amount. Additionally, the processor can be associated with a smartphone in communication with the user assistance device. Furthermore, the wearable user assistance device can correspond to audio glasses that include at least one speaker on the frame.

According to another aspect, a disclosed embodiment can include a computer-implemented method. The method comprises executing, on a processor, instructions that cause the processor to perform operations associated with transaction validation. The operations include detecting a payment terminal that supports electronic payment through payment cards at a point of sale, determining a transaction amount for validation from the payment terminal, generating audio of the transaction amount with a text-to-speech converter, and initiating playing of the audio on a wearable user assistance device. The operations further comprise analyzing one or more images captured by a camera of the user assistance device to detect the payment terminal and requesting by way of the user assistance device that a user initiate wireless communication between the payment terminal and the user assistance device. Additionally, detecting the payment terminal comprises detecting a wireless signal transmitted by the payment terminal. The operations can further comprise establishing communication between the user assistance device and the payment terminal. Further, the operations comprise initiating optical character recognition to determine the transaction amount from an image of a display of the payment terminal. The operations also comprise initiating the playing of an audio message on the user assistance device that includes instructions regarding one or more actions to validate the transaction amount.

In accordance with another aspect, a disclosed embodiment can include a computer-implemented method. The method comprises detecting a payment terminal that supports electronic payment through payment cards at a point of sale based on detection of a wireless signal from the payment terminal, establishing wireless communication with the payment terminal, generating an audio version of a transaction amount for validation received from the payment terminal with a text-to-speech converter, and triggering playing of the audio version on a wearable user assistance device. The method further comprises sending a message to a user of the wearable user assistance device to initiate broadcast of the wireless signal from the payment terminal. Furthermore, the method comprises analyzing the transaction amount, generating a recommendation to accept or deny the transaction amount based on a result of the analyzing, generating an audio representation of the recommendation, and triggering playing of the audio representation on the wearable user assistance device.

To the accomplishment of the foregoing and related ends, certain illustrative aspects of the claimed subject matter are described herein in connection with the following description and the annexed drawings. These aspects indicate various ways in which the subject matter can be practiced, all of which are intended to be within the scope of the disclosed subject matter. Other advantages and novel features may become apparent from the following detailed description when considered in conjunction with the drawings.

DETAILED DESCRIPTION

Figure 1:
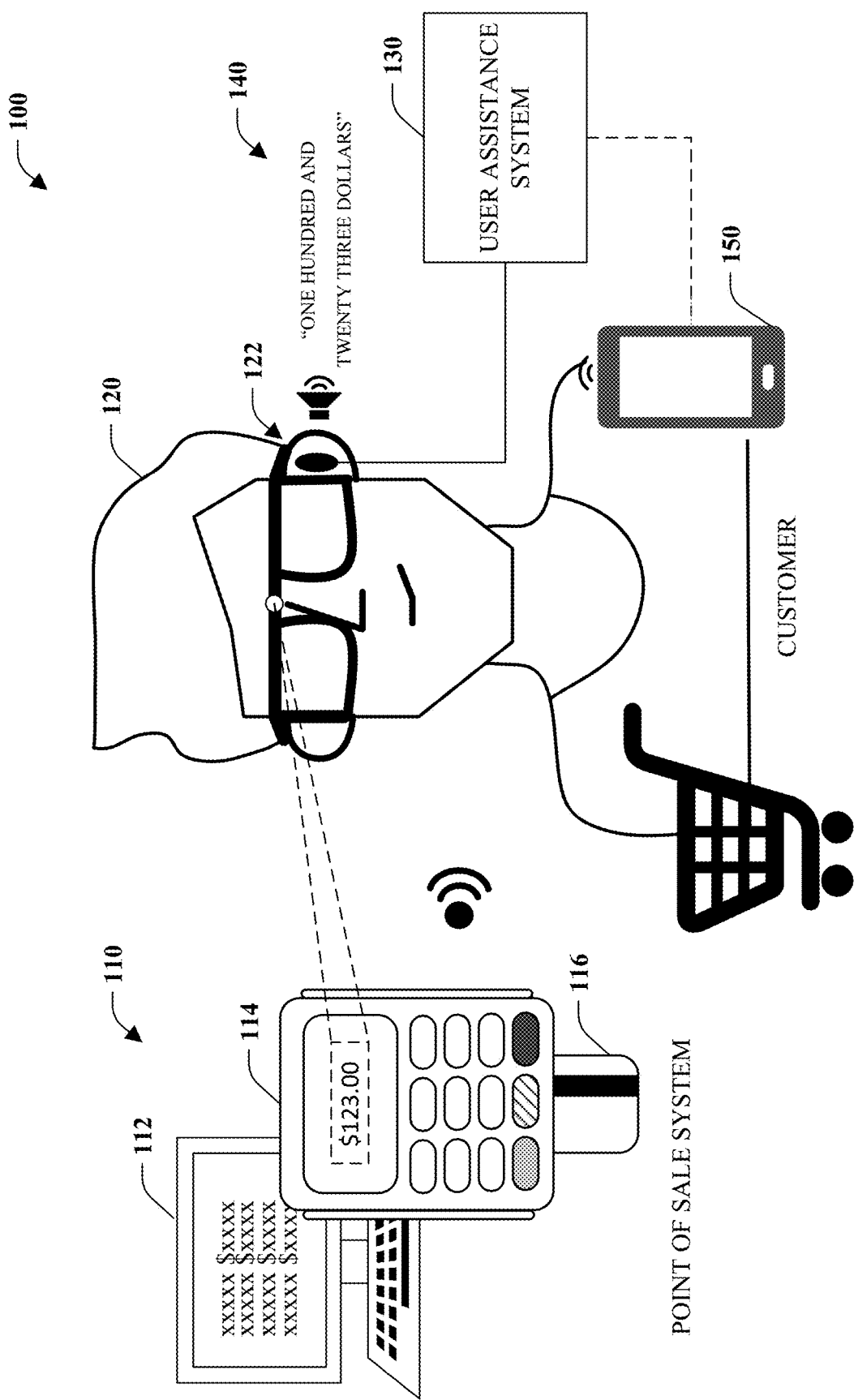
FIG. 1 illustrates an overview of an example implementation.

Payment terminals can request a customer verify a transaction amount before further processing. Verification is a significant validation step in that the customer agrees to pay a merchant the amount from his credit or debit account. Furthermore, backing out the charges can be an enormous hassle with unintended ramifications if the amount is wrong. For example, a customer would have less money than expected, which could lead to a declined payment or an overdraft or other fees. Further, the customer may not recognize the charge amount and report the transaction as fraudulent, leading to further processing and potentially canceling the current card and mailing a new card. The customer would be without the card's purchasing power until the new card arrived, and then the customer may have to update accounts with the new card number.

If a customer has a visual impairment of any kind, the customer is likely to have difficulty reading a small font on the terminal. As a result, a customer may verify the amount by pressing a corresponding button (e.g., green button) without confirming that the amount charged is correct. Customers may choose this route for several reasons. For example, the customer may be in a hurry and simply comply with a cashier's request to verify the transaction amount. Alternatively, the customer may not want to announce publicly that the customer has a visual impairment. For instance, even if the customer's impairment is minor and the customer could read the amount by moving closer to the display or putting on reading glasses, the customer may choose not to and attempt to pass themselves off as someone that is not visually impaired. Consequently, the customer may simply press a green button that is easier to discern on a gray terminal than small black text on a grayish background. However, if the amount is incorrect, this can lead to customer frustration and consume many resources to correct the mistake.

Details herein pertain to embodiments associated with audible transaction verification with a user assistance device. A payment terminal can be detected at checkout, for example, based on the presence of a wireless signal or analysis of one or more images. Wireless communication is established after the payment terminal is detected, if available. A transaction amount subject to validation is determined from the payment terminal. For instance, the payment terminal can wirelessly communicate the amount, or computer vision-based analysis of one or more images of a payment terminal display can determine the amount. Subsequently, audio of at least the transaction amount can be generated, for instance, using text to speech converter or technology. Next, playing the audio on a user assistance device, such as smart glasses or earpieces, is triggered. Consequently, a transaction amount can be communicated to a customer that can be understood even by a visually impaired customer while not making it known that the customer is visually impaired. Further, privacy of the information is protected by not playing the amount on a speaker for all to hear. Additional functionality can also be employed to aid a customer in determining whether or not to verify the transaction amount. For example, the transaction amount can be analyzed based on context and a suggestion made regarding verification.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Referring initially to FIG. 1, a high-level overview of an example implementation 100 is depicted. As shown, the implementation 100 includes point of sale system 110, customer 120, user assistance device 122, and user assistance system 130.

The point of sale system 110 includes register 112 and payment terminal 114. The register 112 can be a cash register or other mechanism for use in tracking items and item prices as they are added to a transaction. The payment terminal 114 is a special-purpose machine that enables electronic payment processing. Once all products or services have been added, the customer 120 can present a payment card 116, such as a debit or credit card, to the payment terminal 114 to pay. Here, the payment card 116 is inserted into the payment terminal 114 instead of swiping or tapping the card on the payment terminal 114. The payment terminal 114 can present a total transaction amount on a display and request the customer 120 verify the total amount to be paid using the payment card 116. The user can utilize keys on the payment terminal to verify the amount. For instance, the bottom right key can be colored green and utilized to accept the amount, and the bottom left key can be colored red and selected to reject the amount.

The customer 120 can be equipped with a user assistance device 122. For example, the user assistance device 122 can correspond to any wearable device that can play audio, including smart glasses (e.g., Bose® sunglasses), augmented reality glasses/headset, headphones, earpieces, hearing aids, or a combination thereof. Here, the user assistance device 122 corresponds to smart glasses capable of playing audio. The smart glasses also include a camera to capture still images or video in this instance.

The user assistance system 130 is operable to facilitate interaction between the payment terminal 114 of the point of sale system 110 and the customer 120 through the user assistance device 122. More particularly, the user assistance system 130 can enable detecting the presence of a payment terminal 114, establishing communication with the payment terminal 114, if available, determining the amount displayed, and generating and triggering playing of an audio version of the amount to the customer 120 through the user assistance device 122.

In one instance, the payment terminal 114 can broadcast a pairing signal that can be detected by the user assistance device 122. In this case, the user system software can assist in pairing the payment terminal 114 and the assistance device 122 to establish a wireless means of communication, for example, by way of Bluetooth®. The payment terminal 114 can communicate the total transaction amount for verification. The user assistance system 130 can receive the communication and generate an audio representation of the transaction amount 140. Subsequently, the user assistance system 130 can trigger playing of the audio through acoustic transducers, or speakers, of the wearable assistance device 122. Here, the total transaction amount is "$123.00," and the audio representation 140 played to the user is "one hundred and twenty-three dollars."

In another situation, the payment terminal 114 may not have the ability to communicate wirelessly with other devices. In this case, a camera associated with the assistance device 122 can be employed. The camera can capture one or more images, and the user assistance system 130 can employ computer-vision-based analysis techniques to first detect the presence of a payment terminal. Subsequently, the same or different images can be analyzed to determine a total transaction amount for verification. The transaction amount can be output as text, and a text-to-speech converter can be utilized to transform the numerical amount into an audio representation of the transaction amount 140. Playing of the audio through the user assistance device 122 can then be triggered. The customer 120 can next accept or reject the transaction amount, for example, by way of buttons on the payment terminal 114 or other means.

A combination of image analysis and wireless communication can also be utilized. In one instance, a camera associated with the assistance device 122 can acquire and analyze images to detect the presence of the payment terminal 114. Subsequently, the user assistance system 130 can prompt the customer 120 through the user assistance device 122 to establish communication with the payment terminal 114. For example, the prompt can instruct the customer 120 to press a particular button on the payment terminal 114 to initiate pairing the payment terminal 114 to the user assistance device 122. After communication is established, the transaction amount can be transmitted from the payment terminal 114 to the assistance device 122, an audio representation can be generated, and playing of the audio representation can be initiated.

In one instance, the camera can also capture the amount displayed by the payment terminal, and a check can be performed to ensure that the amounts match. Further analysis of the transaction amount can detect an outlier or amount outside an expected pattern or distribution. A recommendation can then be made to the customer 120 to accept or reject the transaction amount based on the analysis result. In one instance, the recommendation can be audible. However, other communication means, such as a visual cue, can also be employed.

In accordance with one embodiment, the user assistance system 130 can be incorporated within the user assistance device 122. Alternatively, the user assistance system 130 can be executed on a smartphone 150 or another mobile computing device in communication with the user assistance device 122. Use of the smartphone 150 can be helpful for legacy or other assistance devices that do not natively support execution of the user assistance system 130. Further, execution can be split such that the assistance device performs a portion of the user assistance system 130 while another portion is performed by the smartphone 150.

Although not limited thereto, in a situation in which the customer 120 is visually impaired, the user assistance system 130, in combination with the user assistance device 122, provides an effective way for the customer 120 to verify the total transaction amount, improve customer satisfaction, and reduce resource utilization for mistake correction. Moreover, communication is discreet, and privacy is maintained, which is in stark contrast to using a loudspeaker at the point of sale that can be heard by others proximate to the customer 120.

Figure 2:
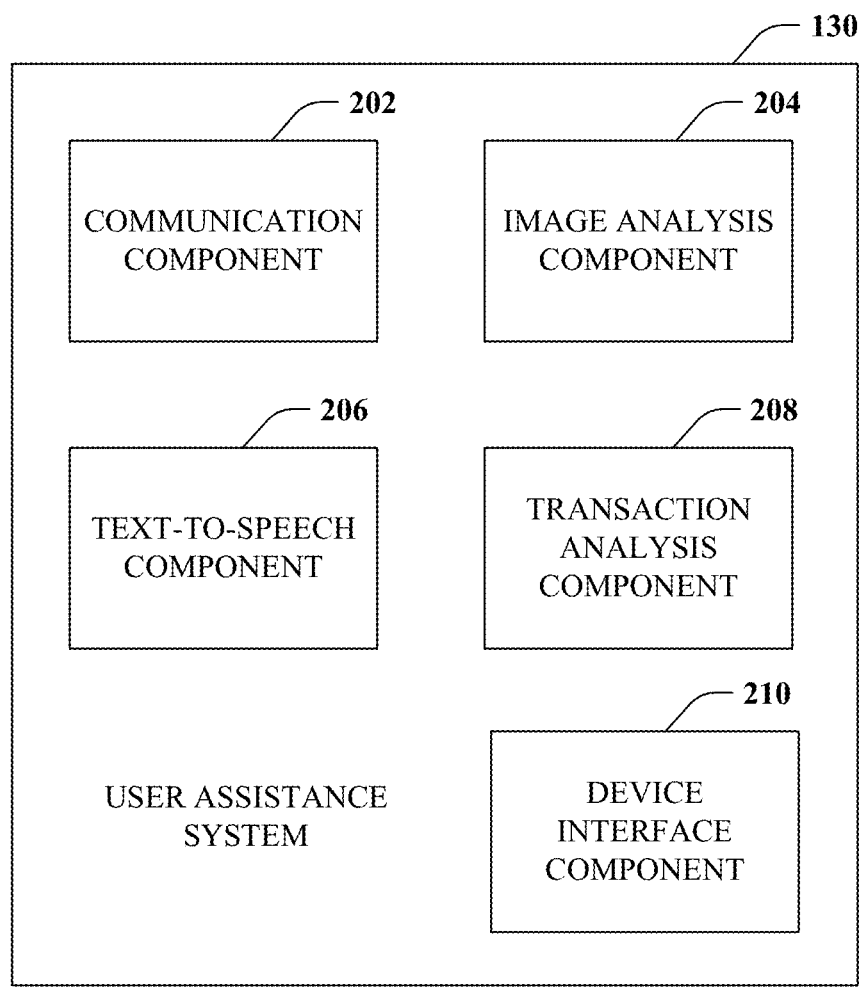
FIG. 2 is a block diagram of an example user assistance system.

FIG. 2 is a block diagram depicting an example user assistance system 130 in further detail. The user assistance system 130 includes a communication component 202, image analysis component 204, text-to-speech component 206, transaction analysis component 208, and device interface component 210. The communication component 202, image analysis component 204, text-to-speech component 206, transaction analysis component 208, and device interface component 210 can be implemented by a processor coupled to a memory that stores instructions that cause the processor to perform the functionality of each component when executed. Consequently, a computing device can be configured to be a special-purpose device or appliance that implements the functionality of the user assistance system 130. Further, portions of the system 130 can be distributed across computing devices such as a user assistance device and smartphone or made accessible by way of a network service.

The communication component 202 is operable to enable communication with a payment terminal or the like. In accordance with one aspect, wireless communication is enabled by a payment terminal. The communication component 202 can establish wireless communication between the payment terminal and an assistance device. Although not limited thereto, wireless communication can be short-range radio frequency communication such as Bluetooth, Zigbee, and infrared transmission, among others. The communication component 202 can facilitate pairing the payment terminal with the assistance device to permit at least receipt of data from the payment terminal to the assistance device. In one instance, the communication component 202 can prompt users to aid setup and subsequent communication. In accordance with one aspect of this disclosure, the communication component 202 can enable communication of a total transaction amount for verification by a customer.

The image analysis component 204 is configured to analyze the content of one or more images or a series of images comprising a video. The image analysis component 204 can implement and employ various computer vision techniques.

Figure 3:
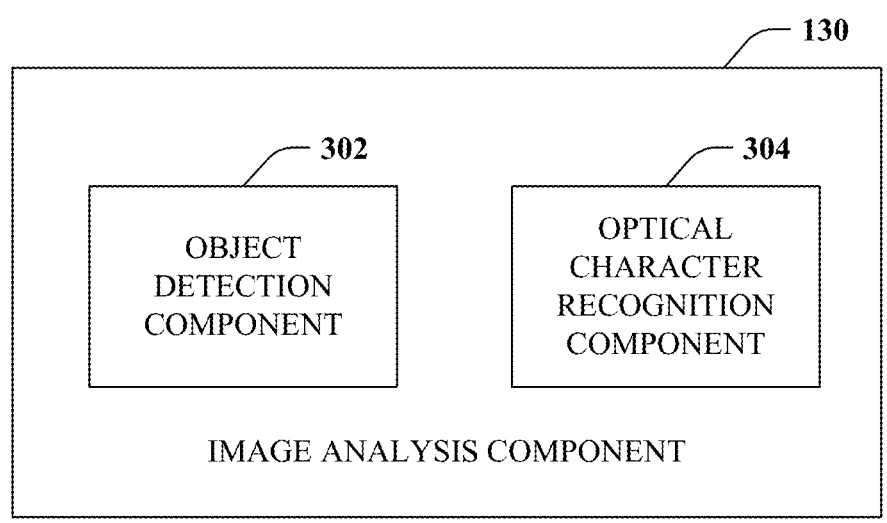
FIG. 3 is a block diagram of a sample image analysis component.

Turning briefly to FIG. 3, the image analysis component 204 is illustrated in further example detail. The image analysis component 204 includes object detection component 302 and optical character recognition component 304. The object detection component 302 is operable to analyze an image and identify the presence or absence of at least a payment terminal. The object detection component 302 employs a computer vision technique to recognize or detect payment terminals within an image or video using machine learning and pattern recognition. For example, a deep neural network can be trained with a labeled data set and will learn features (e.g., keypad, display, card slot) and build the model automatically based on the data set. The optical character recognition component 304 is operable to use optical character recognition techniques to recognize alphanumerical characters presented on a payment terminal display, such as a total transaction amount for verification, and convert the characters into text. The optical character recognition component 304 can employ pattern recognition, artificial intelligence, and computer vision techniques to preprocess an image to improve the chances of successful recognition (e.g., de-skew, despeckle), recognize text characters, and post-process (e.g., constrain to a lexicon (e.g., English), correct errors).

Returning to FIG. 2, the text-to-speech component or converter 206 is operable to convert text produced by the image analysis component 204 into speech. In other words, text can be read aloud or converted into audio for playing to a customer. The text-to-speech component 206 can perform preprocessing or tokenization to convert raw text like numbers and abbreviations to written out words. Subsequently, phonetic transcriptions of each word can be assigned to each word, and the text can be divided into units like phrases and sentences. Subsequently, a speech synthesizer is employed to convert a symbolic linguistic representation into sound.

The transaction analysis component 208 is operable to analyze a transaction concerning whether or not a customer should approve a transaction. Per one aspect, the transaction analysis component 208 can employ outlier detection to identify transactions that fall outside an expected pattern or distribution. The expected pattern or distribution can be associated with the purchase history of a particular customer or a set of customers. For example, suppose a customer is asked to confirm a $1,200 transaction for a pizzeria when it is known or can be determined that particular customer or most customers typically spend less than $20. In that case, this transaction can be flagged as an outlier and a customer alerted. For example, a recommendation can be transmitted that suggests the customer decline the transaction. By contrast, if it can be determined that the transaction amount is consistent with past customer purchase history, a recommendation can be provided that suggests the customer accept or approve the transaction amount. For example, suppose a customer purchases a large beverage from a coffee shop for $5 most Mondays, and approval of a transaction amount of $5 at the coffee shop on Monday is requested. Since the transaction amount is consistent with customer purchase history, a recommendation to approve or accept that transaction amount can be provided to the customer.

If the product or service prices are available, each price can be analyzed for outliers. Further, the total can be analyzed for consistency with the products or services purchased. For example, a point of sale screen can identify the number and price of products or services that form part of a transaction, which can be acquired through wireless communication or based on analysis of an image of the screen. Prices of products or services can be compared to known store prices, average industry prices, or past purchased prices. In addition, the total of the products or services comprising a transaction can be compared to the total transaction amount subject to verification. Suppose a product or service price is outside expected values or the total is inconsistent with the transaction products or services. In that case, an alert recommending the customer decline the transaction can be provided.

Further, the number of products and the quantity of each product can be available based on customer input or visual analysis. In this scenario, the transaction analysis component 208 can compare the number of products and quantity of each product to that provided by a point of sale screen for consistency. If the number of products or quantities varies from what is displayed on the screen, a recommendation can be provided to reject the transaction. For example, if the transaction shows a quantity of three for a product and only one is identified, a suggestion can be made to reject or decline the transaction.

The device interface component 210 is operable to enable interaction with a user assistance device. In accordance with one aspect, the assistance device can expose an application programming interface (API) that the device interface component 210 can use to perform actions. For example, the device interface component 210 can invoke a call to play audio on a speaker of the assistance device of a transaction amount and optionally a recommendation regarding the transaction amount. Similarly, the device interface can employ API calls to facilitate communication pairing and acquisition of input data, such as images from a device camera. In one implementation, the device interface component 210 can execute on a smartphone or other computing device that controls interaction with the user assistance device. Alternatively, the device interface component 210 can execute on the user assistance device itself.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component to provide aggregate functionality. Communication between systems, components and/or sub-components can be accomplished following either a push and/or pull control model. The components can also interact with one or more other components not specifically described herein for the sake of brevity but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers). Such components, among others, can automate certain mechanisms or processes performed thereby, making portions of the systems and methods more adaptive as well as efficient and intelligent. By way of example, and not limitation, at least the image analysis component 204, text-to-speech component 206, and transaction analysis component 208 can employ such mechanisms with respect to detecting objects, recognizing characters, synthesizing text to voice, and generating recommendations as to whether to accept or reject a transaction amount.

In view of the example systems described above, methods that can be implemented in accordance with the disclosed subject matter will be better appreciated with reference to flow chart diagrams of FIGS. 4-8. While for purposes of simplicity of explanation, the methods are shown and described as a series of blocks, it is to be understood and appreciated that the disclosed subject matter is not limited by the order of the blocks, as some blocks can occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 4:
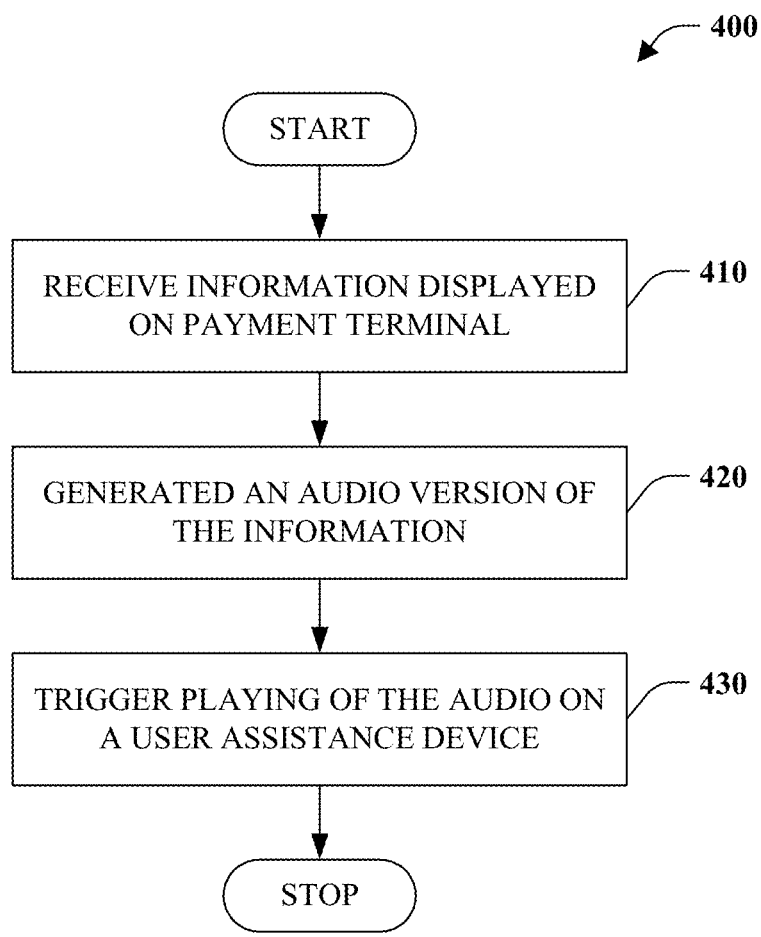
FIG. 4 is a flow chart diagram of a user assistance method.

Turning attention to FIG. 4, a flow chart diagram of a user assistance method 400 is illustrated. The method 400 can be implemented by the user assistance system 130 and employed in conjunction with merchant transactions and verification of transaction amounts.

At reference numeral 410, information displayed on a payment terminal is received, retrieved, or otherwise obtained or acquired. In one instance, the information can be obtained through wireless communication. Alternatively, the information can be acquired by way of image analysis, including optical character recognition. The information can correspond to a total transaction amount that needs to be verified and either accepted or rejected by a customer.

At numeral 420, an audio version of the information is generated. The information can be represented as text received through communication with the payment terminal or recognized from an image of the display of the payment terminal. Regardless, text-to-speech technology can generate the audio version of the information. More particularly, preprocessing or tokenization can be performed to convert raw text like numbers and abbreviations to written out words. Subsequently, phonetic transcriptions of each word can be assigned to each word, and the text can be divided into units like phrases and sentences. Subsequently, a speech synthesizer is employed to convert a symbolic linguistic representation into sound.

At reference numeral 430, playing the audio version of the information on a user assistance device is triggered. In one instance, the user assistance device can be a wearable device with a speaker for playing audio to a user or customer. For example, the user assistance device can be glasses with an incorporated speaker, a hearing aid, headphones, or the like (e.g., earbuds, augmented reality glasses). The audio representation can be provided and playing triggered, for example, utilizing an application programming interface (API) of the user assistance device.

Figure 5:
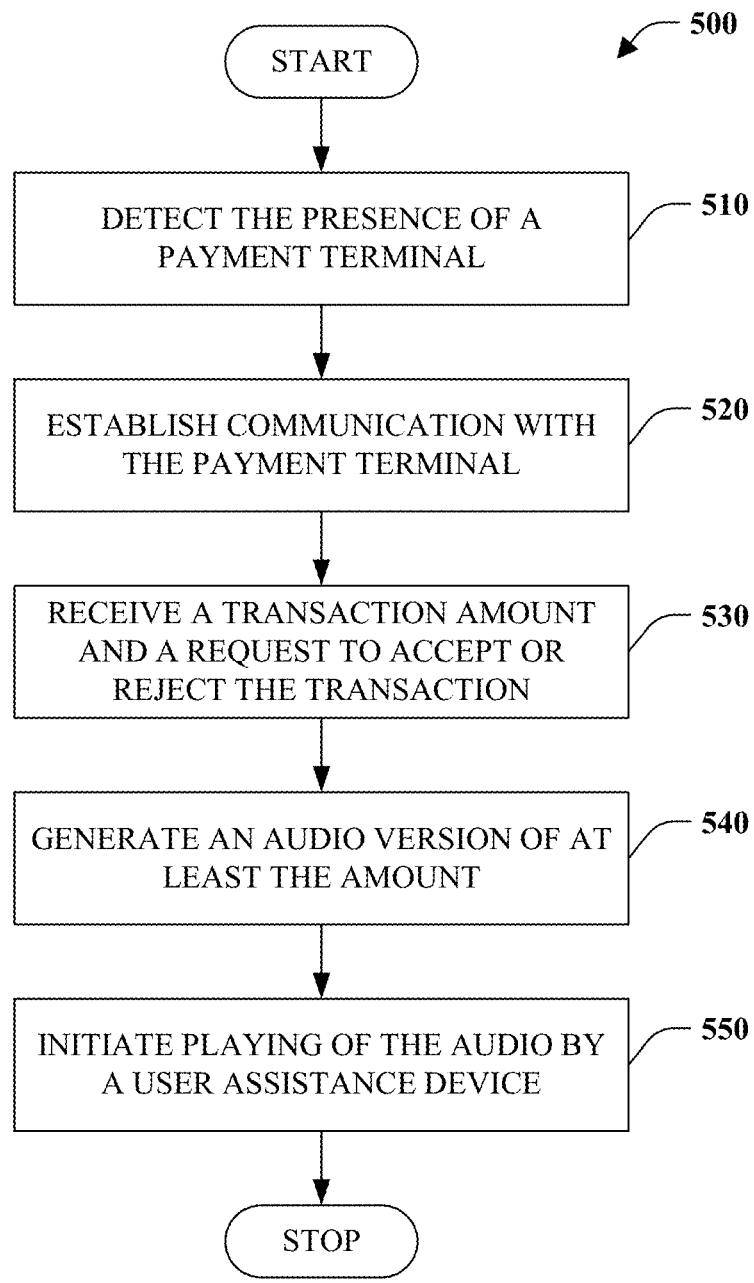
FIG. 5 is a flow chart diagram of a user assistance method with wireless communication

FIG. 5 depicts a user assistance method 500. The method 500 can be implemented by the user assistance system 130 to aid in user verification of transaction amounts associated with payment terminals.

At reference numeral 510, the presence of a payment terminal is detected. In accordance with this aspect, the presence can be detected based on detection of a wireless signal. The wireless signal can be broadcast and detectable by a user assistance device. A short-range radio signal such as Bluetooth, Zigbee, or the like can be utilized in one instance.

At reference 520, communication is established with the payment terminal. In other words, communication is established between the payment terminal and the user assistance device. The communication can be established through a pairing process in which the user device is paired with the payment terminal. Once paired, communication is enabled between the user assistance device and the payment terminal, for instance, over a personal area network (PAN).

At reference numeral 530, a transaction amount is received, retrieved, or otherwise obtained or acquired along with a request to accept or reject the transaction. The transaction amount is the total amount to be debited from a customer's account for the transaction. It can be acquired wirelessly over the communication means unprompted or in response to a request by the user assistance device.

At numeral 540, an audio version of at least the transaction amount is generated. In one instance, text-to-speech technology can be employed to generate the audio version of the transaction from text of the amount sent by the payment terminal. The numbers can be written out and phonetic transcriptions assigned to each word. Subsequently, a phonetic transcription of each word can be assigned, and a speech synthesizer utilized to convert a symbolic linguistic representation into sound.

At reference numeral 550, playing of the audio is initiated on a user assistance device. More particularly, a user assistance device can be instructed to play the audio on at least one speaker of the assistance device. In this manner, the sound is not broadcast to all within a predefined distance but is provided privately in a way that solely an individual customer hears.

Figure 6:
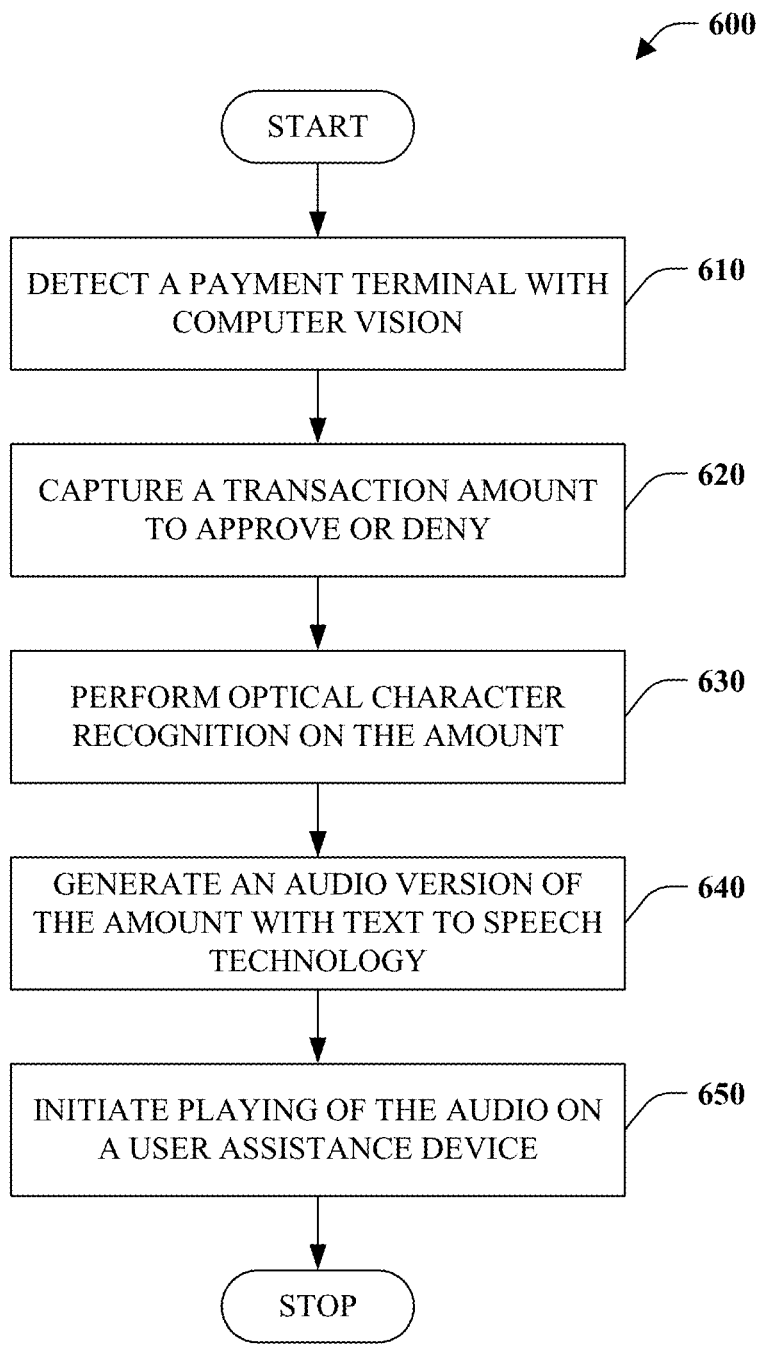
FIG. 6 is a flow chart diagram of a method of user assistance with image analysis.

FIG. 6 is a flow chart diagram of a user assistance method 600 in accordance with another embodiment. The user assistance method 600 can be implemented by the user assistance system 130 and components thereof.

At reference numeral 610, the presence of a payment terminal is detected. The terminal can be detected based on analysis of one or more images. Object detection technology can be employed per one embodiment to analyze an image and determine the presence or absence of a payment terminal. Computer vision techniques can recognize or detect a payment terminal within an image or video using machine learning and pattern recognition. For example, a deep neural network can be trained with a labeled training set of images and learn features of a payment terminal such as a keypad, display, and card slot and automatically build a model that recognizes payment terminals.

At numeral 620, a transaction amount is captured. The transaction amount can correspond to the total cost of purchasing goods or services. Moreover, the transaction amount is subject to verification by a customer. In particular, a customer can approve or deny the transaction amount. In one aspect, the transaction amount can be captured by an imaging device such as a camera embedded or otherwise associated with or linked to a user assistance device.

At reference numeral 630, optical character recognition can be performed on the captured transaction amount. Optical character recognition can recognize alphanumerical characters in an image of a payment terminal display and convert the characters into text. Pattern recognition, artificial intelligence, and computer vision techniques can be employed to preprocess an image to improve the chances of successful recognition (e.g., de-skew, despeckle), recognize text characters, and post-process (e.g., constrain to a lexicon (e.g., English), correct errors).

At reference numeral 640, an audio version of the transaction amount is generated with text-to-speech technology. More specifically, preprocessing or tokenization can be performed to convert raw text like numbers into written out words. Next, phonetic transcriptions of each word can be assigned. Finally, a speech synthesizer is employed to convert a symbolic linguistic representation into sound.

At reference numeral 650, playing of the audio or sound representation of the transaction amount is initiated on a user assistance device. For instance, a command can be executed that triggers playing of the audio on one or more speakers of the user assistance device. For example, the audio can be played on one or both of the right and left sides of a headphone or earbud.

Figure 7:
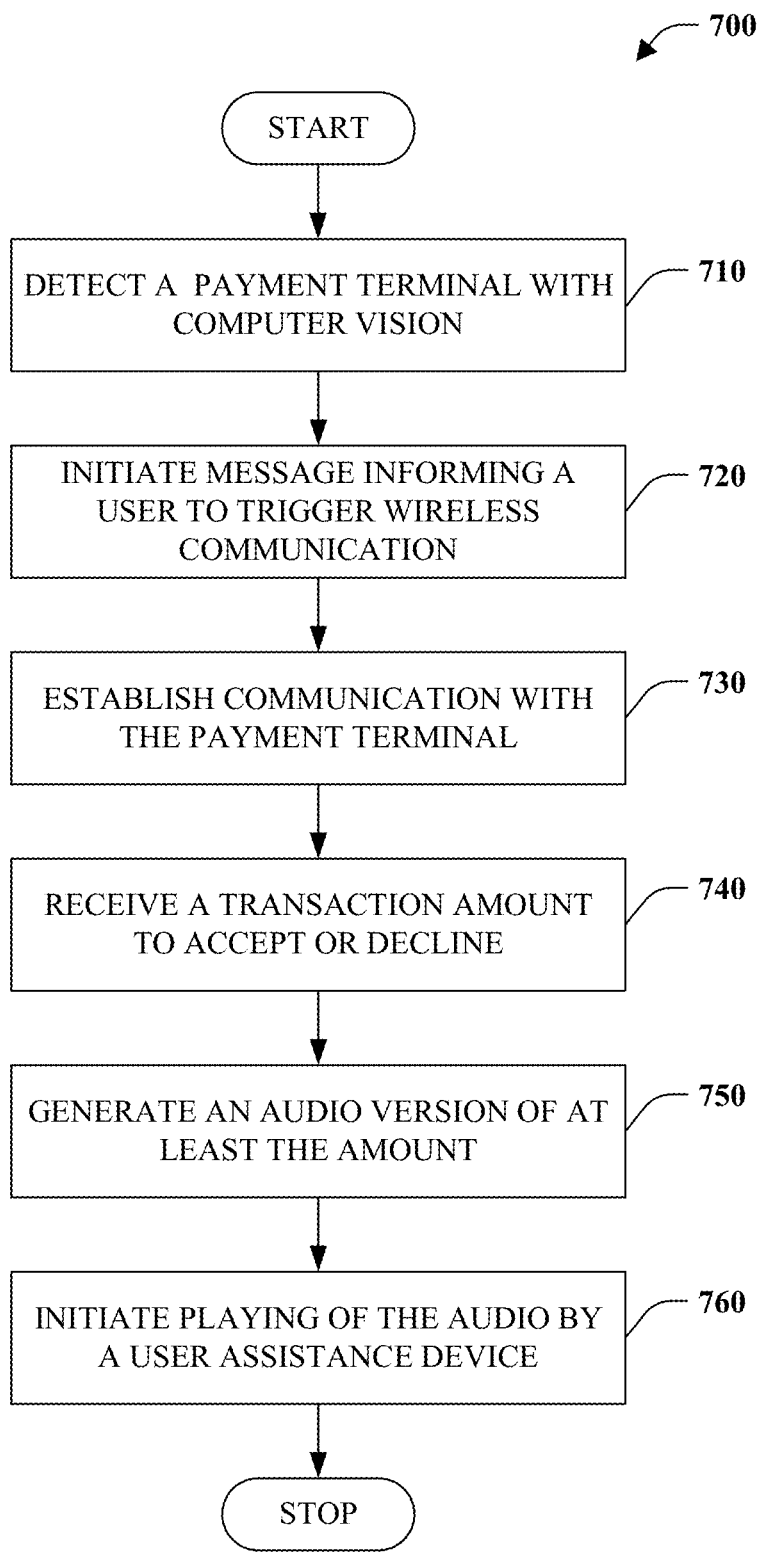
FIG. 7 is a flow chart diagram of a method of user assistance with image analysis and wireless communication.

FIG. 7 depicts a method of user assistance 700 that employs a combination of image analysis and wireless communication. The method can be implemented by the user assistance system 130 and components thereof.

At reference numeral 710, a payment terminal is detected based on analysis of one or more images. Object detection technology can be utilized to determine the presence or absence of a payment terminal. Computer vision techniques can recognize or detect a payment terminal within an image or series of images comprising a video using machine learning and pattern recognition. In one instance, a convolutional neural network can be trained with a set of labeled images. The neural network can learn features of a payment terminal (e.g., keypad, display, card slot) and build a model automatically that recognizes payment terminals.

At reference 720, a message or alert is initiated informing the user to trigger wireless communication. In accordance with one aspect, the payment terminal can enable wireless communication. However, a wireless signal is not active until triggered. For example, a payment terminal button can be designated for this action. If the button is actuated or activated, wireless communication can be established. Accordingly, after detecting a payment terminal, communication can be initiated that directs a user to activate wireless communication.

At reference numeral 730, communication is established between the payment terminal and the user assistance device (or an intermediary device communicatively coupled to the user assistance device). Communication can be established through short-range radio signals, such as Bluetooth or Zigbee, among others. Accordingly, establishing communication can comprise pairing the payment terminal and the user assistance device. After pairing, communication can be over an established personal area network (PAN).

At numeral 740, a transaction amount is received to accept or decline. The transaction amount can correspond to a total purchase amount and be communicated electronically from the payment terminal to the user assistance device. The transaction amount can be specified in alphanumeric characters.

At reference numeral 750, an audio version of the amount is generated. For example, text-to-speech technology can convert alphanumeric characters corresponding to the transaction amount to an audio version. First, raw text, such as numbers, is converted into written words. Next, phonetic transcriptions of each word can be assigned. Finally, a speech synthesizer can convert a symbolic linguistic representation into sound.

At numeral 760, playing the audio version of the transaction amount is initiated on a user assistance device. The amount can be played on a device speaker to enable a visually impaired individual to know the transaction amount prior to accepting or rejecting it. At the same time, privacy is preserved as the amount is not played publicly for all to hear.

Figure 8:
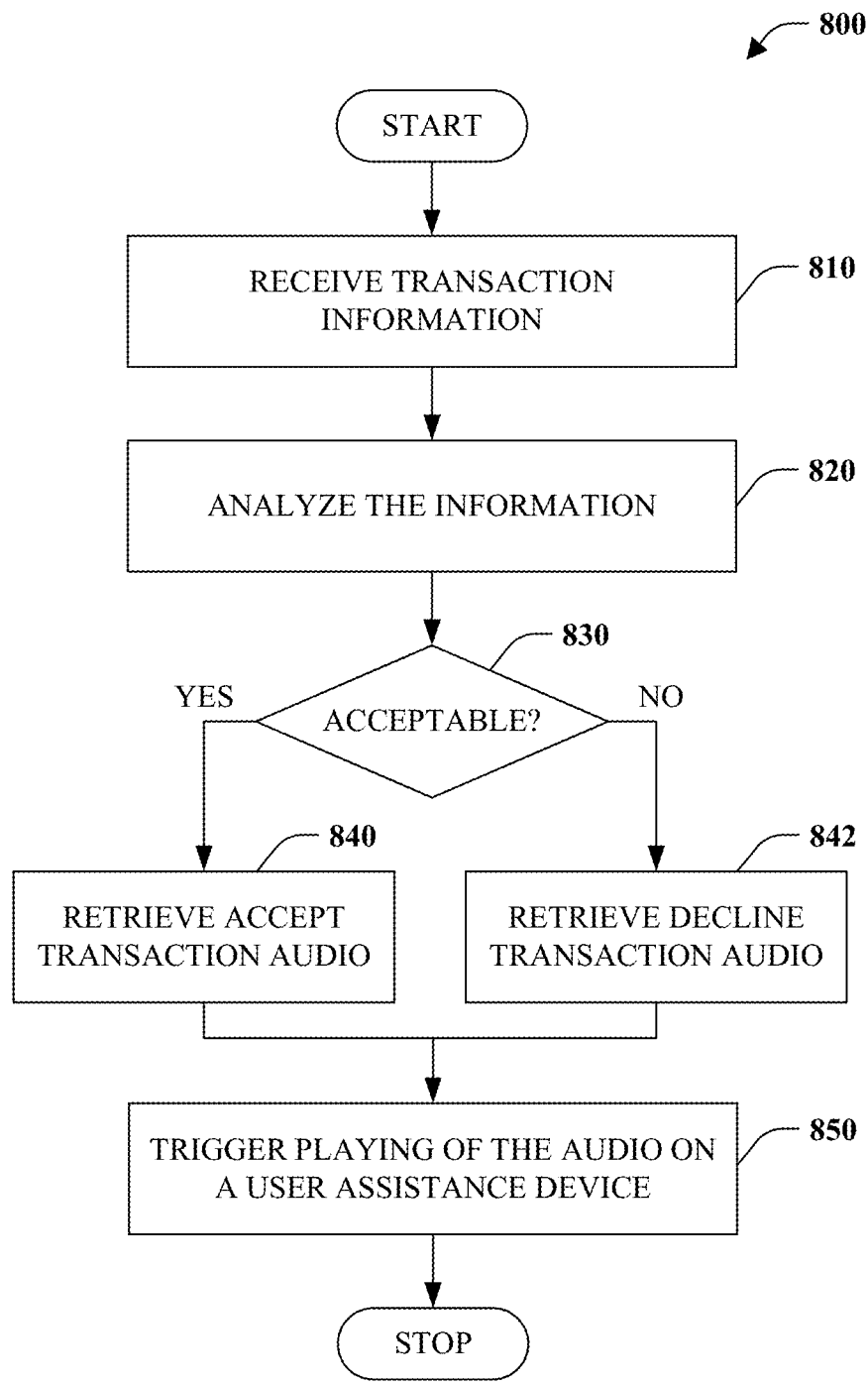
FIG. 8 is a flow chart diagram of a method of analyzing transaction information.

FIG. 8 is a flow chart diagram of a method 800 of transaction analysis. The method 800 can be implemented and performed by the user assistance system 130 and, more particularly, the transaction analysis component 208.

At reference numeral 810, transaction information can be received, retrieved, or otherwise obtained or acquired. In one instance, the transaction information can correspond to a total transaction amount or purchase price provided on a payment terminal. The information can also include the products or services that comprise the transaction, such as price and quantity. Substantially any available information regarding a transaction can be acquired and exploited for transaction analysis.

At reference numeral 820, the received information is analyzed. In accordance with one aspect, the analysis can correspond to outlier detection to identify transactions that fall outside an expected pattern or distribution. In one instance, the analysis can concern the total transaction amount. The expected transaction amount can depend on a particular merchant as well as past customer purchase history, among other things. For example, a $1,200 transaction amount for a pizzeria may be an outlier, but a $20 transaction amount is likely not an outlier. As another example, consider a situation in which the customer typically purchases a large beverage from a coffee shop for $5 on Mondays. If the transaction amount is $5 on a Monday, the transaction is consistent with past customer purchase history and thus is likely not an outlier.

If the product or service prices are available, each price can be analyzed to determine if it is an outlier. Further, the total can be analyzed for consistency with the products or services purchased. For example, a point of sale screen can identify the number and price of products or services that form part of a transaction. Prices of products or services can be compared to known store prices, average industry prices, or past purchased prices. In addition, the total of the products or services comprising a transaction can be compared to the total transaction amount subject to verification. Suppose a product or service price is outside expected values or the total is inconsistent with the transaction products or services. Here, an outlier can be said to have been detected.

At reference numeral 830, a determination is made as to whether or not a result of the analysis is acceptable. An acceptable result does not detect an outlier but is consistent with an expected pattern or distribution. By contrast, an unacceptable result does detect an outlier. If the result is acceptable ("YES"), the method 800 continues to numeral 840. If the result is unacceptable ("NO"), the method 800 proceeds to numeral 842.

At numeral 840, audio associated with an acceptable result, and thus transaction, is retrieved. The audio can suggest that the customer accept the transaction amount at a payment terminal. Subsequently, the method 800 proceeds to reference numeral 850.

At numeral 842, audio associated with an unacceptable result, and thus transaction, is retrieved. In this case, the audio can recommend that the customer reject the transaction amount at the payment terminal. Next, the method 800 continues at reference numeral 850.

At reference numeral 850, playing the audio is triggered on a user assistance device. The audio will recommend that the customer accept or reject the transaction amount. The audio can be speech or a single sound such as a buzzer to reject or a chime to accept. Further, the alert is not confined to audio. For example, a green light can be presented that indicates that the system has not found any issues, and the customer should thus accept the transaction amount. Alternatively, a red light or stop sign can be presented to suggest the customer decline a potentially problematic transaction amount.

The subject disclosure pertains to a technical problem with point of sale systems and, more specifically, payment terminal transaction verification. Payment terminals operate with a small display, often with limited character and background contrast. It is assumed that customers have good eyesight. However, this is not always the case, leading to the bypass of transaction verification by vision-impaired customers. The technical solution involves employing a user assistance device in conjunction with a payment terminal. Information displayed on a payment terminal can be communicated to a user audibly through a user assistance device. The payment terminal and the user assistance device can communicate wirelessly to request and receive information.

Alternatively, information presented on a display can be captured in an image, extracted, and transformed to sound to be played by the user assistance device. Further, transaction amounts can be analyzed, and feedback can be provided as a suggestion to approve or reject a transaction.

The above description focuses on validating a transaction amount utilizing a user assistance device with a payment terminal. However, the subject matter is not intended to be limited thereto. Instead, disclosed aspects can be utilized with respect to any content provided on a point of sale register or payment terminal. For example, some merchants ask the user to specify a type of receipt, such as paper, email, or both. This content can also be transformed into audible content playable by a user assistance device to at least aid visually impaired customers.

As used herein, the terms "component" and "system," as well as various forms thereof (e.g., components, systems, sub-systems . . . ) are intended to refer to a computer-related entity, either hardware, a combination of hardware and software, software, or software in execution. For example, a component can be but is not limited to being a process running on a processor, a processor, an object, an instance, an executable, a thread of execution, a program, and/or a computer. By way of illustration, both an application running on a computer and the computer can be a component. One or more components can reside within a process and/or thread of execution, and a component can be localized on one computer and/or distributed between two or more computers.

As used herein, the term "infer" or "inference" generally refer to the process of reasoning about or inferring states of a system, a component, an environment, or a user from one or more observations captured by way of events or data, among other things. Inference can be employed to identify a context or an action or can be used to generate a probability distribution over states, for example. An inference can be probabilistic. For example, computation of a probability distribution over states of interest can be based on a consideration of data or events. Inference can also refer to techniques employed for composing higher-level events from a set of events or data. Such inference can result in the construction of new events or new actions from a set of observed events or stored event data, whether or not the events are correlated in close temporal proximity, and whether the events and data come from one or several events and data sources.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 9:
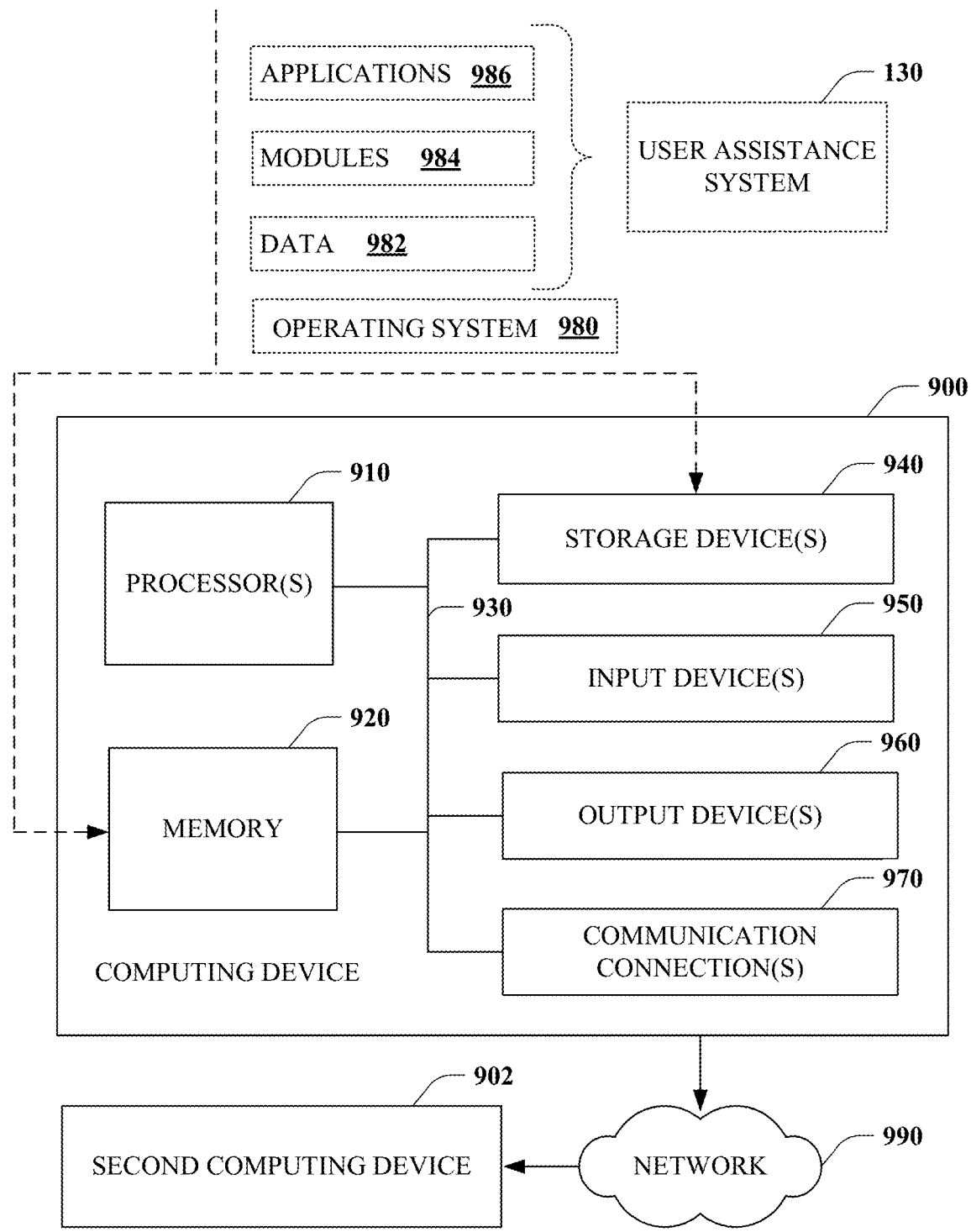
FIG. 9 is a block diagram illustrating a suitable operating environment for aspects of the subject disclosure.

To provide a context for the disclosed subject matter, FIG. 9, as well as the following discussion, are intended to provide a brief, general description of a suitable environment in which various aspects of the disclosed subject matter can be implemented. However, the suitable environment is solely an example and is not intended to suggest any limitation on scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on stand-alone computers. In a distributed computing environment, program modules can be located in one or both of local and remote memory devices.

With reference to FIG. 9, illustrated is an example computing device 900 (e.g., desktop, laptop, tablet, watch, server, hand-held, programmable consumer or industrial electronics, set-top box, game system, compute node). The computing device 900 includes one or more processor(s) 910, memory 920, system bus 930, storage device(s) 940, input device(s) 950, output device(s) 960, and communications connection(s) 970. The system bus 930 communicatively couples at least the above system constituents. However, the computing device 900, in its simplest form, can include one or more processors 910 coupled to memory 920, wherein the one or more processors 910 execute various computer-executable actions, instructions, and or components stored in the memory 920.

The processor(s) 910 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. The processor(s) 910 can also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 910 can be a graphics processor unit (GPU) that performs calculations concerning digital image processing and computer graphics.

The computing device 900 can include or otherwise interact with a variety of computer-readable media to facilitate control of the computing device to implement one or more aspects of the disclosed subject matter. The computer-readable media can be any available media accessible to the computing device 900 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storing information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 900. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 920 and storage device(s) 940 are examples of computer-readable storage media. Depending on the configuration and type of computing device, the memory 920 can be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 900, such as during start-up, can be stored in non-volatile memory, while volatile memory can act as external cache memory to facilitate processing by the processor(s) 910, among other things.

The storage device(s) 940 include removable/non-removable, volatile/non-volatile storage media for storage of vast amounts of data relative to the memory 920. For example, storage device(s) 940 include, but are not limited to, one or more devices such as a magnetic or optical disk drive, floppy disk drive, flash memory, solid-state drive, or memory stick.

Memory 920 and storage device(s) 940 can include, or have stored therein, operating system 980, one or more applications 986, one or more program modules 984, and data 982. The operating system 980 acts to control and allocate resources of the computing device 900. Applications 986 include one or both of system and application software and can exploit management of resources by the operating system 980 through program modules 984 and data 982 stored in the memory 920 and/or storage device(s) 940 to perform one or more actions. Accordingly, applications 986 can turn a general-purpose computer 900 into a specialized machine in accordance with the logic provided thereby.

All or portions of the disclosed subject matter can be implemented using standard programming and/or engineering techniques to produce software, firmware, hardware, or any combination thereof to control the computing device 900 to realize the disclosed functionality. By way of example and not limitation, all or portions of the user assistance system 130 can be, or form part of, the application 986, and include one or more modules 984 and data 982 stored in memory and/or storage device(s) 940 whose functionality can be realized when executed by one or more processor(s) 910.

In accordance with one particular embodiment, the processor(s) 910 can correspond to a system on a chip (SOC) or like architecture including, or in other words integrating, both hardware and software on a single integrated circuit substrate. Here, the processor(s) 910 can include one or more processors as well as memory at least similar to the processor(s) 910 and memory 920, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the user assistance system 130 and/or associated functionality can be embedded within hardware in a SOC architecture.

The input device(s) 950 and output device(s) 960 can be communicatively coupled to the computing device 900. By way of example, the input device(s) 950 can include a pointing device (e.g., mouse, trackball, stylus, pen, touchpad), keyboard, joystick, microphone, voice user interface system, camera, motion sensor, and a global positioning satellite (GPS) receiver and transmitter, among other things. The output device(s) 960, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 950 and output device(s) 960 can be connected to the computing device 900 by way of wired connection (e.g., bus), wireless connection (e.g., Wi-Fi, Bluetooth), or a combination thereof.

The computing device 900 can also include communication connection(s) 970 to enable communication with at least a second computing device 902 utilizing a network 990. The communication connection(s) 970 can include wired or wireless communication mechanisms to support network communication. The network 990 can correspond to a personal area network (PAN), local area network (LAN), or a wide area network (WAN) such as the Internet. In one instance, the computing device 900 can correspond to a user assistance device. The second computing device 902 can correspond to a payment terminal. In another instance, the computing device 900 can correspond intermediary computing device (e.g., smartphone), and the second computing device 902 can correspond to the user assistance device. The intermediary device can communicate with the user assistance device over the network 990.

What has been described above includes examples of aspects of the claimed subject matter. It is, of course, not possible to describe every conceivable combination of components or methods to describe the claimed subject matter. However, one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
a processor coupled to a memory that includes instructions that, when executed by the processor, cause the processor to:
automatically detect a presence of a payment terminal, based on computer vision analysis of the payment terminal, that supports electronic payment through payment cards at a point of sale;
determine a transaction amount presented by the payment terminal for audio-based user-validation from the payment terminal;
generate, based on the determined transaction amount presented by the payment terminal, an audio representation of the determined transaction amount with a text-to-speech converter; and
trigger playing of the audio representation on a wearable user assistance device.

2. The system of claim 1, wherein the instructions further cause the processor to establish wireless communication with the payment terminal.

3. The system of claim 2, wherein the instructions further cause the processor to determine the transaction amount based on communication with the payment terminal.

4. The system of claim 1, wherein the instructions further cause the processor to detect the presence of the payment terminal is based on computer vision analysis of one or more images captured by the wearable user assistance device.

5. The system of claim 4, wherein the instructions further cause the processor to request by way of the wearable user assistance device that a user initiate wireless communication between the payment terminal and the wearable user assistance device.

6. The system of claim 5, wherein the request instructs the user to activate the wireless communication from the payment terminal.

7. The system of claim 1, wherein the instructions further cause the processor to initiate optical character recognition to determine the transaction amount from an image of a display of the payment terminal.

8. The system of claim 1, wherein the instructions further cause the processor to generate a recommendation to approve or deny the transaction amount based on analysis of the transaction amount.

9. The system of claim 1, wherein the processor is associated with a smartphone in communication with the wearable user assistance device.

10. The system of claim 1, wherein the wearable user assistance device corresponds to audio glasses that include at least one speaker on a frame.

11. A computer-implemented method, comprising:
executing, on a processor, instructions that cause the processor to perform operations associated with transaction validation, the operations comprising:
detecting a presence of a payment terminal, based on object detection of the payment terminal, that supports electronic payment through payment cards at a point of sale;
determining a transaction amount for audio-based user-validation from the payment terminal;
generating, based on the determined transaction amount presented by the payment terminal, an audio representation of the determined transaction amount with a text-to-speech converter; and
initiating playing of the audio representation on a wearable user assistance device.

12. The method of claim 11, wherein the operations further comprise analyzing one or more images captured by a camera of the wearable user assistance device to detect the payment terminal based on the object detection.

13. The method of claim 12, wherein the operations further comprise requesting by way of the wearable user assistance device that a user initiate wireless communication between the payment terminal and the wearable user assistance device.

14. The method of claim 11, wherein detecting the payment terminal further comprises detecting a wireless signal transmitted by the payment terminal.

15. The method of claim 11, wherein the operations further comprise establishing wireless communication between the wearable user assistance device and the payment terminal.

16. The method of claim 11, further initiating optical character recognition to determine the transaction amount from an image of a display of the payment terminal.

17. The method of claim 11, wherein the operations further comprise initiating playing of an audio message on the wearable user assistance device that includes instructions regarding one or more actions to validate the transaction amount.

18. A computer-implemented method, comprising:
detecting a payment terminal that supports electronic payment through payment cards at a point of sale based on object detection of the payment terminal;
establishing wireless communication with the payment terminal;
generating an audio version of a transaction amount presented by the payment terminal for audio-based user-validation received from the payment terminal with a text-to-speech converter; and
triggering playing of the audio version on a wearable user assistance device.

19. The method of claim 18, further comprising sending a message to a user of the wearable user assistance device to initiate broadcast of a wireless signal from the payment terminal.

20. The method of claim 18, further comprising:
analyzing the transaction amount;
generating a recommendation to accept or deny the transaction amount based on a result of the analyzing;
generating an audio representation of the recommendation; and
triggering playing of the audio representation on the wearable user assistance device.

* * * * *